Patented Feb. 14, 1933

1,897,119

UNITED STATES PATENT OFFICE

IVAN GUBELMANN AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

VAT DYESTUFF AND PROCESS OF MAKING THE SAME

No Drawing.   Application filed February 26, 1930.  Serial No. 431,628.

This invention relates to readily dispersible vat dyestuffs to be used in forming dyestuff pastes and to a process for preparing the same.

Vat dyestuffs are insoluble in water and when applied to fibres are usually reduced to their leuco form. This step of reduction in the case of dye baths may be performed in the baths, or, as in the case of printing processes, directly upon the fibres. It is well known that the tinctorial efficiency of vat dyestuffs for the purpose of dyeing fabric, particularly by the "pigment padding method," depends considerably on the state of subdivision of the dyestuffs. For maximum efficiency a fine state of subdivision is essential. Beyond a certain point, however, this state of subdivision cannot be economically obtained by milling.

It is accordingly an object of this invention to provide a method of preparing vat dyestuffs in a sufficiently fine state of subdivision so that the vat dyestuff pastes prepared therefrom will exhibit great homogeneity and be highly dispersible.

Other and further important objects of this invention will become apparent from the following description and appended claims.

It has been our experience that many dyestuffs although precipitated in a finely divided form in the isolation of the color body, will not produce readily dispersible dyestuff pastes even on milling. As a result, the application of these dyestuff pastes to the fabric frequently produces blotchy dyeing.

We have found that vat dyestuffs exhibiting these properties and tendencies may be readily treated during certain stages of their preparation with products which may be prepared by sulfonating abietenes, and that these dyestuffs when so treated can be readily dispersed.

These new treating agents which are herein generically classified as sulfonation products of hydrocarbons of the abietene family, may be prepared by sulfonating abietene- or abietine-containing material in accordance with the methods disclosed in the Henke and Weiland U. S. Patent No. 1,853,352, and the U. S. Patent to Clyde O. Henke No. 1,853,353. As is well known, abietene and abietine are hydrocarbons obtainable by the pyrogenic decomposition of abietic acid, abietyl chloride, or material containing either of these. Depending upon the source of the rosin or abietic acid the decomposition products will vary in the relative proportions of these two hydrocarbons as well as in the amount of other impurities. (Ruzicka, Helvetica Chimica Acta, volume 6, pages 838 to 840.) It is possible also that these compounds exist in various isomeric forms in various mixtures depending upon the source of the initial material. We have sulfonated many of these products and find that they all are beneficial for our present purpose.

The sulfonation products of hydrocarbons of the abietene family are all soluble in water and can be transformed in solution into their alkali metal salts, that is, sodium, potassium and ammonium, by the use of the alkali metal bases, carbonates and the like. The solution of alkali metal salts can then be evaporated to isolate these salts.

The following examples in which parts by weight are given serve to illustrate various methods of carrying out our invention:

Example 1

100 parts of Anthrene Jade Green paste (Color Index 1101) containing some dye material in coarse form are milled up with one part of a sulfonation product of a hydrocarbon of the abietene family, obtainable as above. After processing for a short time, the coarser particles are disintegrated into a finer state of subdivision. When this product is applied to fabric in accordance with standard practice, it gives dyeings of excellent evenness and high tinctorial value.

Example 2

An amount of press cake equivalent to 100 parts of Anthrene Blue GCD (Color Index 1113) containing some dye material in coarse form are milled up with two parts of the sodium salt of the sulfonation product above described and a little water. After agitating for a short time, the coarser particles are disintegrated into a finer state of subdivision. This treated product when applied to fabric in accordance with standard methods, yields dyeings of excellent evenness and high tinctorial values.

*Example 3*

To 100 parts of Anthrene Golden Orange G paste (Color Index 1096) are added four parts of the sodium salt of a sulfonation product as above described and the mass evaporated to dryness. After grinding for a short time to break up the lumps, the dyestuff is in such a condition that when added to water it forms a paste in which the dyestuff is dispersed in a fine state of subdivision.

*Example 4*

To 25 parts of finely milled Anthrene Golden Orange G powder (Color Index 1096) are added four parts of the dry sodium salt of an abietene sulfonic acid as above described and the product milled up for thorough mixing. This product when added to water is very rapidly dispersed in a fine form, as may be demonstrated by straining the suspension through a fine silk bolting cloth.

The above described processes for dispersing the vat dyestuffs and the resulting products are found especially useful in the "pigment padding method of dyeing" and in "package dyeing".

It is of course to be understood that the above examples are merely illustrative of our invention, and that other vat dyestuffs having a coarse structure may be dispersed into a fine state of subdivision by similar treatment with abietene sulfonic acid bodies, either in the form of the free acid or of its water soluble salts.

We are aware that numerous details of the process may be varied through a wide range without departing from the principles of this invention, and we, therefore, do not purpose limiting the patent granted hereon otherwise than necessitated by the prior art.

We claim as our invention:

1. In the process of forming a readily dispersible vat dyestuff, the step of incorporating in the dyestuff an abietene sulfonic acid body.

2. As a new product of manufacture, a vat dyestuff preparation containing an abietene sulfonic acid body.

3. As a new product of manufacture, a vat dyestuff paste containing an abietene sulfonic acid body.

4. As a new product of manufacture, a vat dyestuff paste containing a dispersing agent selected from the group of compounds obtainable by sulfonating a pyrogenic decomposition product of rosin.

5. In the process of dyeing textile fibers with vat dyestuffs, the step of effecting the application of the vat dyestuffs to the fibers in the presence of a dispersing agent selected from the group of compounds obtainable by sulphonating a pyrogenic decomposition product of rosin.

6. In the process of dyeing textile fabrics with vat dyestuffs, the step of effecting the application of the vat dyestuffs to the fibers in the presence of an abietene sulphonic acid body.

7. In the process of dyeing textile fabrics with vat dyestuffs, the step of applying a composition comprising a vat dyestuff and an abietene sulphonic acid body to the fiber.

In testimony whereof, we have hereunto subscribed our names at Carrollville, Milwaukee County, Wisconsin.

IVAN GUBELMANN.
ROBERT J. GOODRICH.